No. 690,902. Patented Jan. 7, 1902.
D. T. WALLACE.
NUT LOCK.
(Application filed May 27, 1901.)
(No Model.)

Witnesses:
Carl H. Crawford
William L. Hall

Inventor:
David T. Wallace
by Poole & Brown
his Attorneys

THE NORRIS PETERS CO., PHOTO-LITHO., WASHINGTON, D. C.

UNITED STATES PATENT OFFICE.

DAVID T. WALLACE, OF CHICAGO, ILLINOIS.

NUT-LOCK.

SPECIFICATION forming part of Letters Patent No. 690,902, dated January 7, 1902.

Application filed May 27, 1901. Serial No. 61,980. (No model.)

*To all whom it may concern:*

Be it known that I, DAVID T. WALLACE, of Chicago, in the county of Cook and State of Illinois, have invented certain new and useful Improvements in Nut-Locks; and I do hereby declare that the following is a full, clear, and exact description thereof, reference being had to the accompanying drawings, and to the letters of reference marked thereon, which form a part of this specification.

This invention relates to improvements in nut-locks of that class wherein the nut is provided on its inner face with a series of projections or ratchet-teeth and wherein a washer is non-rotatively mounted on the bolt between said nut and the body through which the bolt passes, which washer is provided with a spring-click adapted for engagement with said projections on the nut to hold the latter in place.

The invention consists in the matters hereinafter set forth, and more particularly pointed out in the appended claims.

Figure 1:
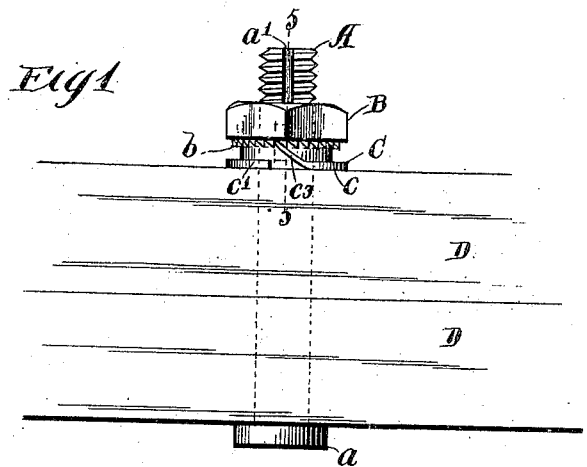
Figure 2:
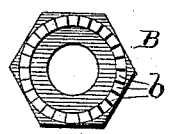
Figure 3:
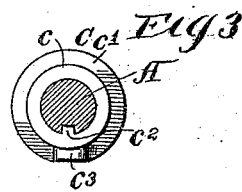
Figure 4:
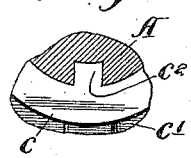
Figure 5:
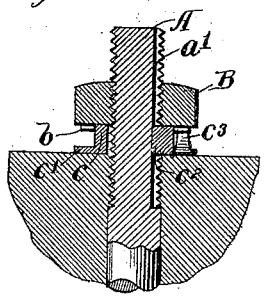
Figure 6:
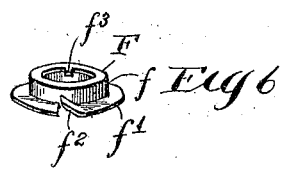
Figure 8:
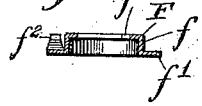

In the drawings, Figure 1 is a side view of two parts bolted together by a bolt which is provided with my improved nut-lock. Fig. 2 is an inner face view of the nut removed from the bolt. Fig. 3 is a cross-section of the bolt, showing the washer in position thereon.
Fig. 4 is an enlarged view of a fragment of the washer and bolt, showing the locking-lug on the washer. Fig. 5 is a fragmentary longitudinal section taken through the bolt, nut, and washer. Figs. 6, 7, and 8 illustrate a modified form of locking-washer.

As shown in said drawings, A designates a bolt having the usual head $a$, B a nut which engages the screw-threaded end of the bolt, and C a washer which has sliding engagement with said bolt inside the nut, but is non-rotative thereon.

D D designate two pieces of wood or other material adapted to be secured together between the nut and bolt-head and shown merely to illustrate the use to which the bolt may be put.

The nut is provided on its inner face with a circular series of projections $b$, which, as herein shown, have the form of ratchet-teeth, though this form is not essential. Said ratchet-teeth project inwardly from the face of the nut as distinguished from being formed in the body of the nut, the teeth standing entirely inside the plane of the face of the nut. The washer C consists principally of a cylindric body $c$, which is provided on its inner end with a radial annular flange $c'$. Said washer is affixed non-rotatively to the bolt by means of a lug $c^2$, projecting into the bore of the washer, and engages a longitudinal groove $a'$ in the bolt. Said cylindric part of the washer is made of a size to fit snugly in the space surrounded by the annular series of teeth or projections $b$ on the nut, as clearly shown in Fig. 4, the inner face of said teeth or projections engaging said cylindric part of the washer, and preventing lateral movement of said washer relatively to the nut. The flange $c'$ of the washer is cut at one place in its circumference and turned outwardly to form a click $c^3$, which is adapted to engage the teeth or projections $b$ on the nut. Said nut is rotated in the direction of inclination of said click $c^3$ from the washer, so that when it is turned down against the click said click interlocks with the teeth or projections and prevents the reverse rotation of the nut in a manner to remove the same so long as said click occupies its usual position. When it is desired to release the nut, the click may be bent inwardly by a suitable implement, thereby permitting reverse rotation of the nut.

As herein shown, the click is made of the full width of the flange, thereby providing an ample bearing-surface between the click and ratchet-teeth. The cylindric part $b$ of the washer is made of such length with respect to the click as to abut firmly against the nut before the pressure of the nut exerts any considerable inward pressure on the click. If the cylindric part of said washer be entirely omitted, the nut might obviously be turned downwardly far enough on the washer to bend the click out of engagement with the ratchet-teeth, and therefore defeat the object or purpose of the device.

The bottom of the groove $a'$ in the bolt is curved concentrically with respect to the axis of the bolt, and the inner end of the lug $c^3$ of the washer is correspondingly curved, as shown in Fig. 4. The said groove $a'$ is made of a depth to extend slightly below the base of the screw-thread on the bolt. The conformation of the bottom of the groove and the inner end of the lug is such as to prevent, when torsional strain is applied to the washer through the nut to turn the same, the lug being raised out of the groove, but, on the other hand, tends to give a firmer interlocking engagement between the lug and groove. If the inner end of the lug were made square or round and the nut fitted somewhat loosely upon the bolt, the torsional strain mentioned would tend to lift the lug out of the groove, and should the lug be lifted beyond the base of the thread on the bolt would, if sufficient force be applied, strip such thread. In such construction it is therefore necessary to make the groove sufficiently deep and the lug sufficiently long to prevent the happening of this contingency. In my construction, on the other hand, it is feasible to make the groove of less depth than if the parts were so constructed as to permit the lug to rise slightly out of the groove under the conditions mentioned, so that I am thereby enabled to save the strength of the bolt and at the same time preserve the full locking effect between the groove and lug.

The construction described, embracing the cylindric extension of the washer which enters the circular space inclosed by the circular series of projections or teeth and fits closely therein, is of considerable practical importance, as this construction prevents relative movement of said washer with respect to the nut or shaking thereof, and thereby assures greater integrity of the lock. It is well known that in devices of this character one of the most serious objections is the liability of the parts to shake or rattle, the continuance of which causes wear and finally disengagement of the locking parts.

In Figs. 6, 7, and 8 I have shown a modification of the washer. In this construction the washer consists of two parts—a sheet-metal part F and a ring F'. The part F is made with a hollow cylindric body $f$ and a radial annular flange $f'$, which latter is cut to form a click $f^2$, as in the construction before described. The ring F' is shaped on its outer margin to fit the interior surface of the cylindric part of the part F and is flattened on its other side to fit the flat surface of the part through which the bolt passes. Said ring and the body of the washer are provided with lugs $f^4$ $f^3$, respectively, which are adapted to engage the groove $a'$ in the bolt. With this construction the flanged part of the washer may be made of sheet-steel by a stamping operation, and the ring F' serves to prevent the body of the sheet-metal part from being crushed. In the use of the washer last described the ring F' is first slipped over the bolt and the sheet-metal part F slipped over the bolt to follow the ring. The action of this form of washer when the parts are assembled is the same as the construction first described.

I claim as my invention—

1. The combination with a bolt and a nut, said nut being provided on its inner face with an annular series of teeth or projections which extend beyond the plane of the inner face of the nut, of a washer non-rotatively mounted on the bolt having a cylindric body which fits snugly within the space surrounded by said teeth or projections and provided on its inner end with a radial annular flange, said flange being cut and bent outwardly to form a click which engages said teeth or projections.

2. The combination with a bolt and a nut, said nut being provided on its inner face with an annular series of teeth or projections which are formed entirely inside the plane of said inner face of the nut, of a washer mounted non-rotatively on the bolt having a cylindric body which fits snugly within the space surrounded by said teeth or projections and provided on its inner end with a radial annular flange, said flange being cut and bent outwardly at one side thereof to form a click which engages said teeth or projections, said cylindric body of the washer extending past the end of said click.

3. The combination with a bolt and a nut, said nut being provided on its inner face with an annular series of teeth or projections which are formed entirely inside the plane of the inner face of the nut, of a washer having a cylindric body which fits snugly within the space surrounded by said teeth or projections and provided on its inner end with a radial annular flange, said flange being cut and bent outwardly at one side thereof to form a click which engages said teeth or projections, said bolt being provided with a longitudinal groove and an inwardly-directed lug on the washer adapted to engage the groove.

4. The combination with a bolt and a nut, said nut being provided on its inner face with an annular series of teeth or projections, of a washer mounted non-rotatively on the bolt, consisting of a sheet-metal part having a hollow cylindric body which is adapted to enter the space surrounded by said teeth or projections, and a radial annular flange on one end of said body which is cut and bent outwardly to form a click for engagement with said teeth or projections, and a ring adapted to fill said hollow cylindric body to prevent crushing thereof.

In testimony that I claim the foregoing as my invention I affix my signature, in presence of two witnesses, this 24th day of May, A. D. 1901.

DAVID T. WALLACE.

Witnesses:
RUSSELL JACKSON,
J. E. HARDGREN.